United States Patent [19]
Durham et al.

[11] 3,880,535
[45] Apr. 29, 1975

[54] ADHESIVE FASTENING DEVICE

[75] Inventors: Walter Thomas Durham, Southfield, Mich.; George John Bury, Lake Villa, Ill.; Edwin Grant Swick, Bartlett, Ill.

[73] Assignee: Illinois Tool Works Inc., Chicago, Ill.

[22] Filed: Nov. 14, 1973

[21] Appl. No.: 415,593

[52] U.S. Cl. ............... 403/241; 52/760; 151/41.7; 151/41.75; 248/205 A; 248/317; 403/191; 403/386
[51] Int. Cl. .............................. F16b 41/00
[58] Field of Search ............ 151/41.75, 41.76, 41.7; 248/205 A, 317; 24/11, 67 AR; 403/189, 237, 241, 191, 386; 85/32 K; 52/760

[56] References Cited
UNITED STATES PATENTS

| | | | |
|---|---|---|---|
| 2,360,424 | 10/1944 | Kauffman | 151/41.75 |
| 2,815,595 | 12/1957 | Davis | 24/67 R |
| 3,191,725 | 6/1965 | Russell | 52/760 |
| 3,342,237 | 9/1967 | Meehan | 151/41.75 |
| 3,406,734 | 10/1968 | Munse | 151/41.75 |
| 3,463,432 | 8/1969 | Ptak | 151/41.75 |
| 3,491,183 | 1/1970 | Brow | 151/41.75 |
| 3,494,646 | 2/1970 | Cumber | 151/41.75 |
| 3,646,982 | 3/1972 | Cushman | 151/41.76 |
| 3,719,792 | 3/1973 | Cuccaro | 151/41.7 |

*Primary Examiner*—Marion Parsons, Jr.
*Attorney, Agent, or Firm*—Robert W. Beart; Thomas W. Buckman

[57] ABSTRACT

A fastening device permitting parts to be mounted to a protuberance on a support surface. The device includes a body with a recess adapted to receive the protuberance and including adhesively coated surfaces within the recess for adhering to the protuberance. A fastening member having an axis generally parallel to the adhesive surfaces is preassembled to the body in such a manner as to insure that the adhesive is loaded primarily in shear.

29 Claims, 21 Drawing Figures

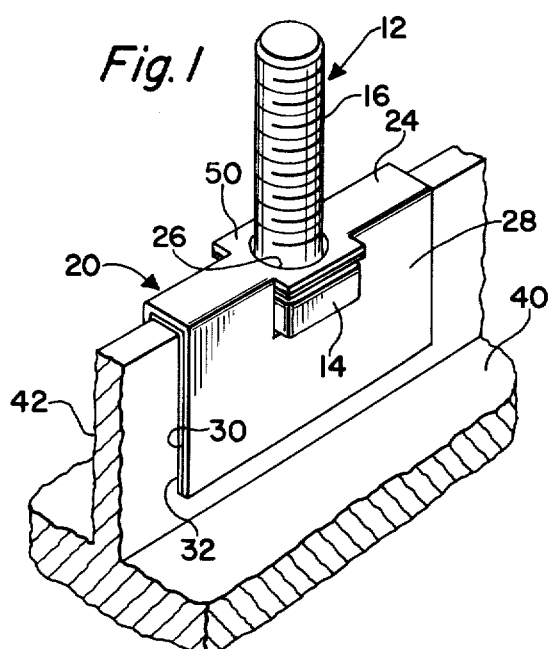
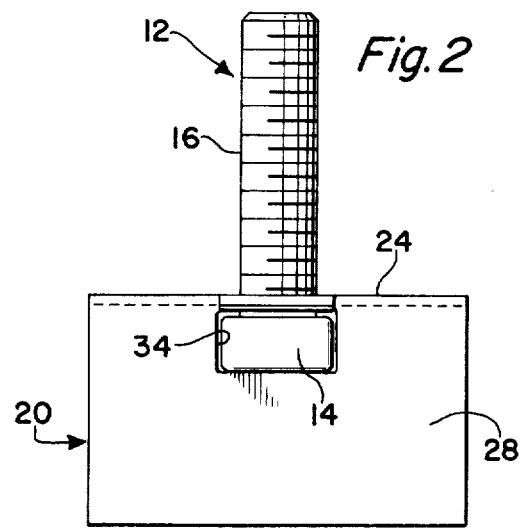
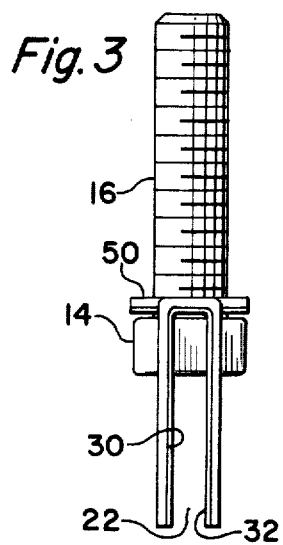
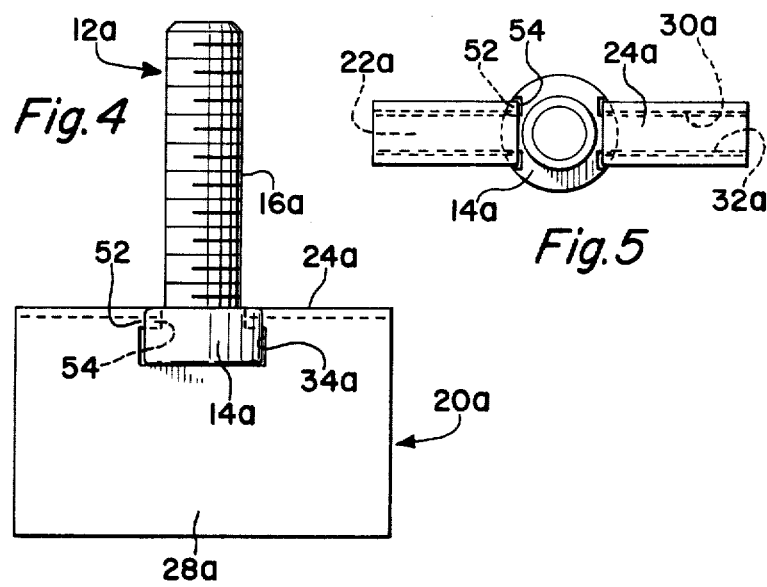
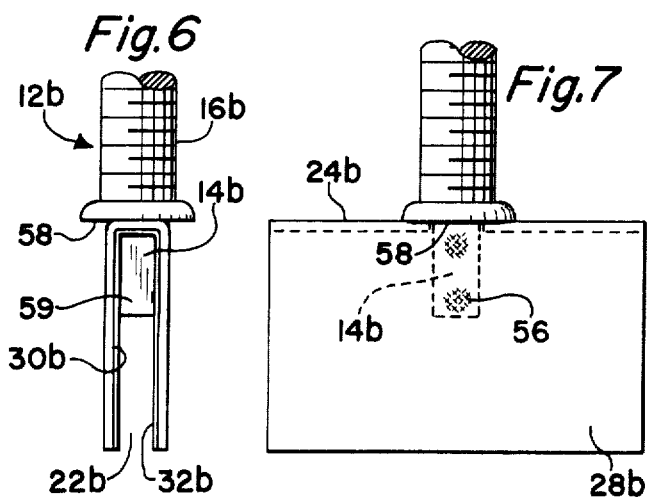
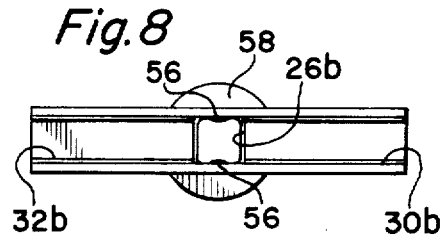

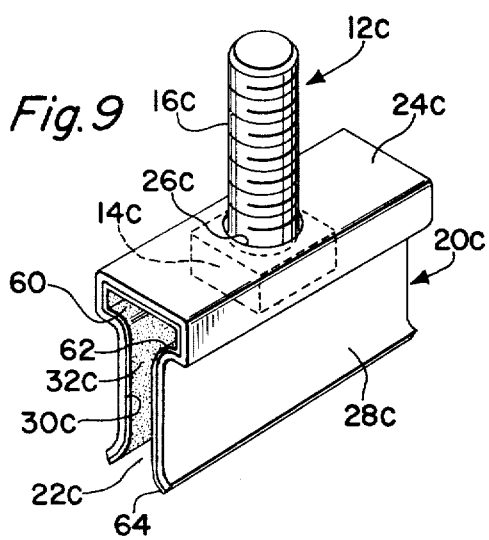
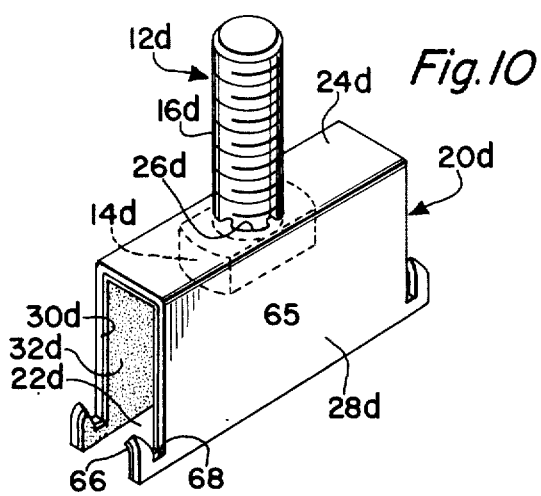
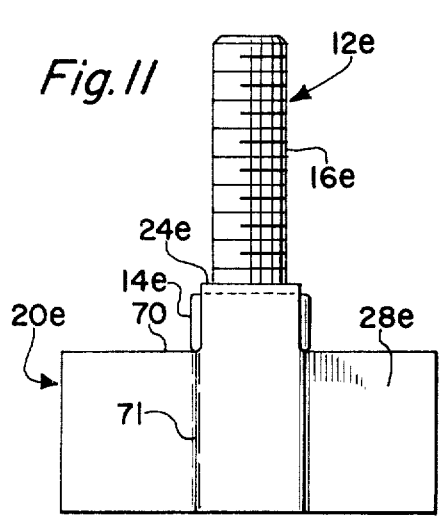
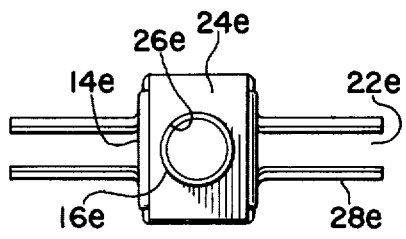
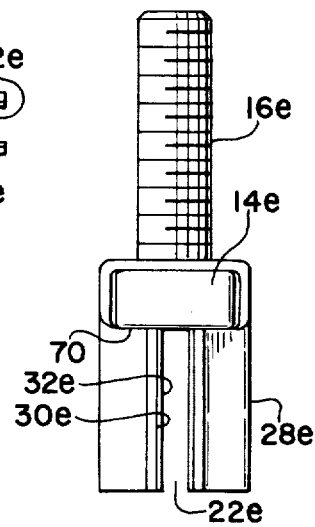
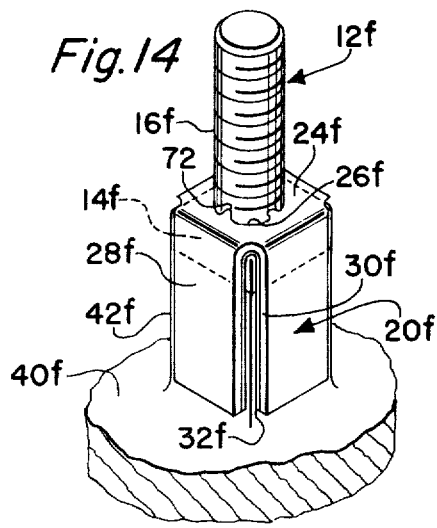
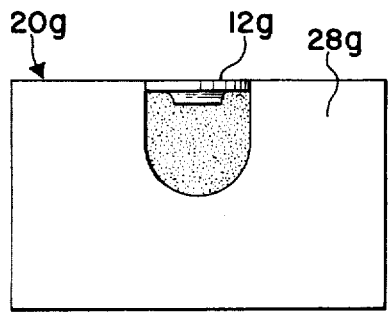
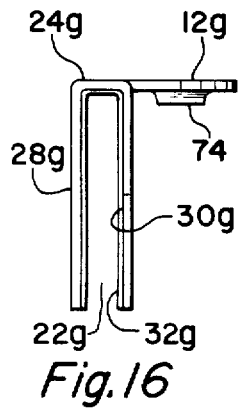

ADHESIVE FASTENING DEVICE

This invention relates generally to a fastening device including a preapplied adhesive surface adapted to be mounted on a protuberance.

There are a number of fastening applications where the attachment support surface is of a structure which does not lend itself readily to the direct application of conventional screw-type fasteners, for example, the structural plastic material used in the construction of automobiles, appliances, etc. In addition, these applications and others may require that the fastening be accomplished by utilizing one, and only one, side of the support surface. This further restricts the type of fastening device which may be utilized since any conventional bolt or screw or rivet will conventionally extend completely through the material.

One technique currently used, in an effort to alleviate these fastening problems, is the provision of a boss on the surface to receive a fastener. The boss is generally molded into the surface for the particular purpose of providing a fastening system. It is adapted to accept a threaded fastener and yet preclude the fastening from completely penetrating through the support surface. This is not a total solution to the problem since the threaded fastener still has a tendency to work itself loose due to vibration, etc. In addition, the costs involved in molding the support surface with bosses for the express purpose of accepting such a threaded fastener are significant.

It is not uncommon to provide such molded structures with thin strengthening ribs along the interior of such a structure. It is, accordingly, an object of the present invention to provide a fastening device which is particularly designed to be mounted and adhered to such a longitudinal protuberance or rib.

It is a further object of the invention to provide a fastening device utilizing an adhesive bond which is loaded primarily in shear.

One of the advantages of the present invention is that a preassembled adhesive fastening device is provided which is easy to handle, store and apply.

A further advantage of the present invention is that a fastening device as described can be applied to a structure without the necessity of particularly designed fastener receiving surfaces.

The foregoing and other objects and advantages are accomplished in the present invention which generally includes a body portion and a fastening member preassembled thereto. The body portion is provided with a recess to receive an adherend protuberance. The inner surfaces of the recess are provided with a heat activatable adhesive coating and the surfaces carrying the adhesive are generally parallel to the axes of the fastener member to insure that the adhesive is loaded primarily in shear.

The several embodiments described herein represent specific inventions relating to various structures to retain the fastener member both from rotation and separation from the body member.

Several embodiments also show the basic invention in conjunction with further inventive features which permit the device to be at least temporarily retained on the support surface prior to activating the adhesive.

Still a further embodiment of the invention describes a device within the basic teachings of the invention and which can be utilized with a boss formed on the structure and which heretofore has specifically been designed to accept a screw threaded member.

BRIEF DESCRIPTION OF THE DRAWINGS

To better understand the invention, reference is made to the accompanying drawings wherein:

FIG. 1 is a perspective view of a preferred embodiment of the invention as it is associated with a complementary adherend protuberance.

FIG. 2 is a side view of the preassembled fastening device shown in FIG. 1.

FIG. 3 is an end view of the preassembled fastening device shown in FIG. 1.

FIG. 4 is a side view of a modified form of the invention.

FIG. 5 is a top view of the modified form of the invention shown in FIG. 4.

FIG. 6 is an end view of a third embodiment of the invention.

FIG. 7 is a side view of the invention shown in FIG. 6.

FIG. 8 is a bottom view of the embodiment shown in FIG. 6.

FIG. 9 is a perspective view of a fourth modification of the preassembled fastening device.

FIG. 10 is a fifth modification of the preassembled fastening device.

FIGS. 11, 12 and 13 are side, top and end views of a sixth modification of the preassembled fastening device.

FIG. 14 is a perspective of a seventh modification of the preassembled fastening device of the invention.

FIGS. 15 and 16 are side and end views of an eighth modification of the invention.

DESCRIPTION OF THE PREFERRED EMBODIMENTS

Figure 17:
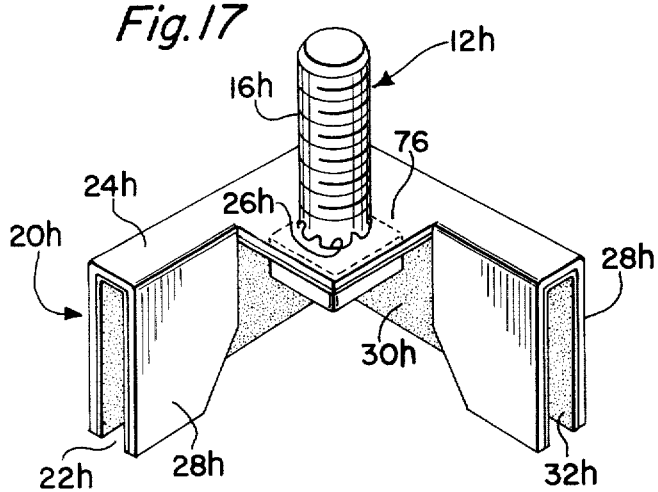
FIG. 17 is a perspective of a ninth modification of the invention.

Turning to FIG. 1, there is shown a preferred embodiment of the invention. The adhesive fastening device embodying the teachings of the present invention includes a fastener member 12 preassembled to a body member 20. The body member will be comprised of a pair of legs 28 interconnected by a bight portion 24. The bight is provided with an aperture 26 to receive the shank 16 of the fastening member. The legs in this preferred embodiment will also include a recess 34 to receive the enlarged head 14 of the fastening device.

The head 14 of the fastening device is generally of a polygonal peripheral shape and preferably square as shown in FIG. 1. This configuration allows the fastener to be preassembled to the body and retained both from relative rotation about its axis and from removal from the body due to the interaction of the bight with the undersurface of the head and the recess 34 with the periphery and top surface of the head.

The bight may be provided with wing-like extensions 50 to provide a bearing surface which covers the entire undersurface of the head 14.

The combination of the bight 24 and the legs 28 forms a recess 22 the width of which generally corresponds to the width of a rib-like protuberance 42 on a support structure 40. The inner surfaces 30 of the legs are provided with a coating of heat activatable thermoplastic or thermosetting adhesive 32.

Thus, the preassembled fastening device may be placed on an adherend surface, such as rib 42. In certain assembly line operations, such as in the assembly of automobiles or appliances, the structure being assembled may be subjected to a heating or drying oven. The heat generated in such an oven will generally be high enough to activate the adhesive. Of course, the adhesive may be activated by any conventional application of heat. While the frictional engagement between the inner surfaces 30 and the rib 42 will generally be great enough to retain temporarily the device prior to the activation of the adhesive, suitable means can be incorporated in the invention to positively retain the device prior to the activation of the adhesive.

It is important to note that the subsequent loading applied to the device through the fastener member 12, as the shank 16 is associated with a complementary threaded member, will load the adhesive bond line primarily in shear since the axis of the fastener 12 is generally parallel to the adhesive surfaces 32. Since an adhesive bond is stronger when loaded in shear than in tension or peel, this becomes an important aspect of the invention.

Certain modifications of the invention are shown in FIGS. 4-21 with fastening device being basically as discussed relative to the preferred embodiment and repetitive discussion is avoided through the use of suffixes to identify like parts.

The second embodiment described in FIGS. 4 and 5 includes a fastener member 12a which also includes a shank 16a and an enlarged head 14a. The head 14a in this embodiment may be of a round configuration. The body 20a is provided with a recess 22a formed beneath the bight portion 24a and delimited on either side by legs 28a. The inner surfaces of these legs 30a are provided with suitable heat activatable adhesive 32a. The head 14a of this fastener member is received in suitable recesses 34a in the legs and portions of the head extend laterally of the legs. However, the fastener member is retained from relative rotation and movement transverse of the bight portion by ear-like projections 52 which are received in suitable complementary recesses 54 beneath the head of the fastener.

The recess 22a is thus adapted to receive an associated rib or protuberance and is adhered thereto by the adhesive 32a. The bond of the adhesive to the protuberance will again be primarily loaded in shear when the shank 16a is utilized for the attachment of subsequent articles.

In the third embodiment of the invention shown in FIGS. 6-8, a fastener member 12b again includes a shank 16b and enlarged head 14b. In this embodiment, however, the head includes a large generally circular radially extending bearing surface 58, and a stem like porjection 59 extending axially beyond the bearing surface and having a generally square cross-sectional configuration of a size compatible with the width of the recess 22b to be nonrotatively retained therein. The bight portion 24b is provided with an aperture 26b corresponding to the cross-sectional configuration of the stem 59b to further aid in nonrotatively retaining the fastening member. The fastening member may then be secured from movement in a direction transverse of the bight by spot welding the stem 59 to the inner side walls of the legs, such as that 56. As in the previous embodiments, at least one of the inner surfaces of the legs 30b is provided with heat activatable adhesive 32b for utilization in the manner described above relative to the basic invention.

In the embodiment shown in FIG. 9, there is shown yet another manner of preassembling a fastener 12c to a body 20c. The body will again include a bight portion 24c integrally connecting a pair of leg portions 20c which extend in planes parallel to the axis of the fastener. The generally U-shaped recess described relative to the above embodiments is modified in this invention by utilizing a slot or recess having a substantially T-shaped configuration. This provides an enlarged head receiving portion 60 which will include shoulder portions 62. Thus, the fastener can be preassembled through a suitable aperture 26c in the bight and retained therein against relative rotation and movement and/or separation from the body portion. The generally polygonally shaped head 14c is securely retained from rotation in the enlarged head receiving portion 60 which is of a width approximating the width of the head. In keeping with the invention, the inner surfaces 30c are provided with heat activatable adhesive 32c. The surfaces 30c again extend generally parallel to the axis of the fastener 12c to insure that the adhesive bond is loaded primarily in shear after the fastener is assembled to a rib on a support surface. The terminal edges 64 of the legs may be flared outwardly. This aids in locating and positioning the rib in the recess 22c. In addition, the legs may be biased inwardly to increase the temporary securement to the rib prior to the activation of tthe adhesive.

The embodiment shown in FIG. 10 shows still another manner of preassembling the fastener 12d to a body 20d. In this modification of the invention, the head 14d is shown to be formed from a rather large diameter head which is sheared to provide a pair of parallel flat surfaces spaced a distance substantially equal to the width of the recess 22d to fit and be nonrotatively retained therein. The fastener 12d may be secured in a preassembled fashion to the bight 24d by swaging a portion of the undersurface of the head in an around undulations formed in the periphery of the aperture 26d as shown by deformations 65. The legs 22d are positioned around an associated rib and may further be temporarily retained to the rib by the barbs 66 which are integrally connected to the terminal edges of the legs by a thin web 68. This will provide a very flexible but firm lock against undesirable movement of the device prior to the curing of the adhesive. The flexible web 68 will provide this frictional engagement without an attendant large force tending to prohibit firm contact between the adhesive bearing surfaces 30d and the associated rib surfaces.

The embodiment shown in FIGS. 11-13 is similar to the embodiments described above but the bight portion 24e is of limited longitudinal extent and primarily serves to retain the enlarged head 14e so that it may rest on the uppermost edge of an associated rib protuberance. The upper edges 70 of the leg 28e will thus be generally coplanar with the upper edge of the associated protuberance when the device is appropriately positioned in a manner similar to that described with reference to the above embodiments. Thus, the embodiment will include a recess 22e which will receive a rib having substantially the width of the distance between the opposing surfaces 30e. In accordance with the teachings of the invention, the surfaces 30e will include a coating of heat activatable adhesive 32e. The polygonally shaped head 14e of the fastener will be retained nonrotatively beneath the bight since the side walls of the saddle-like bight 24e are spaced a distance essentially equal to the distance between two parallel surfaces forming the periphery of the head 14e. The fastener device may also be preassembled and will be retained in the preassembled position since the head will rest upon the upper edge 70 of the legs 28e and more specifically will rest on the corner formed at the juncture of the legs and the central body portion 71.

While the embodiments described heretofore have been directed to the preferred usage of a fastener device on a rather thin rib protuberance, it is apparent that the basic teachings of the invention can be incorporated in a fastening device which can be positioned on a boss-like projection of certain dimensions. Therefore, the embodiment shown in FIG. 14 incorporates a fastener 12f having a shank 16f and an enlarged head 14f. The body portion 20f includes a plurality of legs 28f, such as the four shown in the FIG. 14 and which are adapted to surround the periphery of the boss 42f. The inner surfaces 30f of the legs include a coating of preapplied adhesive 32f. The fastener is preassembled to the body so that the head lies beneath the bight portion 24f and is secured thereto by swaging which provides deformations 72 in a manner similar to the preassembly technique discussed relative to the embodiment of FIG. 10. The head of the fastener will rest on the top of the boss and the inner surfaces 30f of the body will bear against the associated outer surfaces of the boss and be retained thereon through the bond of the adhesive layer 32f. The outer periphery of the head 14f will conform to the noncircular recess 22f to nonrotatively retain the head therein. Since the axis of the fastener 12f is again generally parallel to the surfaces carrying the adhesive, the adhesive bond will be stressed primarily in the shear mode.

The present invention can also be used to provide a female-type fastener secured by adhesive to a rib structure. In FIGS. 15 and 16 such an embodiment is shown wherein the fastener member 12g is essentially an extruded aperture which may have internal threads formed therein to receive an associated male fastener. The fastener 12g is essentially formed by a struck out portion of the leg 28g. The opposing inner surfaces 30g of the recess 22g are again provided with a suitable coating of heat activatable adhesive 32g. Since the axis of the extruded hole in the fastener 12g is parallel to the plane of the adhesive bond, the adhesive will be loaded primarily in shear. While the fastener 12g is shown to be extending laterally of the bight portion 24g, it is within the scope of this invention to locate the extruded hole within the bight portion itself.

In instances where a fastening device is desired at the intersection of two or more ribs, the embodiment shown in FIG. 17 may be used. In keeping with the invention, the fastener 12h is secured to the body 20h through swaging or staking procedures similar to that described above relative to the embodiments of FIGS. 10 and 14. The body, however, will include two pair of legs 28h located on intersecting planes and may conveniently be formed from a single stamping as shown in FIG. 17. The construction of this device will allow a large bearing plate 76 to be formed integral with the bight portions 24h which also will allow the fastener to be preassembled in a position which will allow the bight portion to rest against the upper edge of the ribs. With such an arrangement the axis of the fastener 12h will again be generally parallel to all of the planes of the adhesive carrying surfaces 30h. The rib receiving recesses 32h will provide at least four such surfaces capable of carrying adhesive and creating a bond line therebetween.

Figure 18:
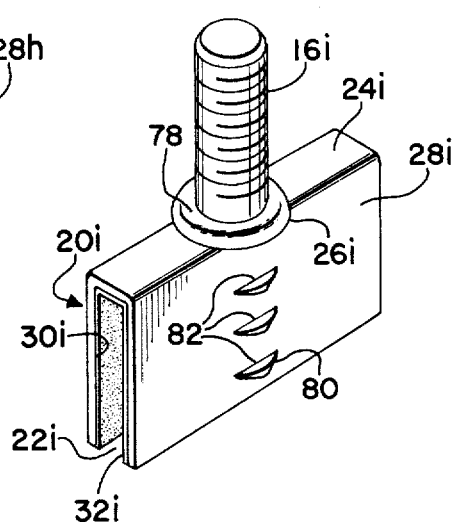
FIG. 18 is a perspective of a tenth modification of the preassembled fastening device.
Figure 19:
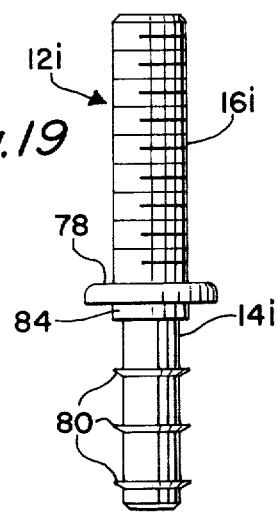
FIG. 19 is a side view of the fastener member utilized in the invention shown in FIG. 18.

The embodiment shown in FIGS. 18 and 19 describe how the basic principles of the invention may be incorporated in a fastening device which is preassembled after the body 20e is completely formed through the use of interlocking ratchets and slits. The head portion of the fastener 12i, as best shown in FIG. 19, includes a stem extending generally along the axis of the shank 16i and which includes one or more sharp crested ribs 80. The portion of the stem adjacent a bearing plate 78 is of a polygonal cross section such as the square section 84. This square section 84 is nonrotatively retained in a complementary polygonal aperture 26i in the bight portion 24i of the body. The side walls of the legs 28i include apertures or slits 82 complementary to the crests of the ribs 80. Thus, the fastener 12i may be preassembled to the body by inserting the head portion 14i through the aperture in the bite so that the ribs 80 will ratchet into locking position within the recesses 82 and prevent the fastener from being removed along the axis of the fastener. The bearing plate 78 may be sized to provide any desired bearing surface in spite of the fact that the bight portion 24i is of a thickness consistent with the thickness of the associated rib.

Figure 20:
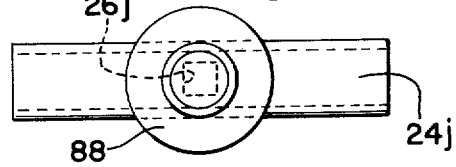
FIGS. 20 and 21 are top and end views of an eleventh modification of the preassembled fastening device.
Figure 21:
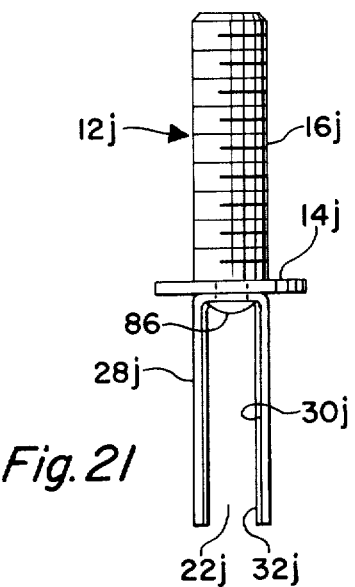

Still another structure used in preassembling a fastener to a body in accordance with the invention is shown in FIGS. 20 and 21. Fastener 12j includes a shank 16j and a head portion 14j. The attachment portion of the head consists of a small axial projection 86 which is adapted to be inserted through a polygonal or noncircular aperture 26i in the bight portion of the body. The projection 86 may then be staked to the undersurface of the bight portion by deforming it into a rivet-like head. The staking forces will also cause the projection to cold flow into nonrotative engagement with the aperture 26j thus securing the fastener against relative rotation and movement in its axial direction. A suitable bearing plate may be provided to increase the bearing surface beyond the width of the bight portion 24j.

Thus it is apparent that there has been provided, in accordance with the invention, a number of embodiments all of which include a fastener portion having an axis which extends generally parallel to the adhesive carrying surface formed in a recess capable of receiving an adhering to a projection so that a secondary attachment may be accomplished to the support surface and in a manner that will load the adhesive bond primarily in shear. It has been shown that the invention can be utilized either by providing a suitable cavity in the projection to receive the head of the fastener or may be utilized by certain embodiments wherein the fastener rests on the uppermost surface of the protuberance. While the invention has been described in conjunction with specific embodiments thereof, it is evident that many alternatives, modifications and variations will be apparent to those skilled in the art in light of the foregoing description. According, it is intended to embrace all such alternatives, modifications and variations as fall within the spirit and broad scope of the appended claims.

We claim:

1. In combination, a system for securing various workpieces to a support surface, including a rib-shaped protuberance with a predetermined, relatively thin, transverse dimension, a U-shaped body member adapted to slide over the protuberance and comprising a pair of legs interconnected by a bight portion, the legs providing a pair of generally opposing surfaces spaced from one another a distance substantially equal to the predetermined transverse dimension of the rib-shaped protuberance, the surface of the legs embracing both sides of the rib-shaped protuberance, a layer of heat activatable adhesive interposed between the protuberance and at least one leg surface to adhesively retain the body member on the support surface upon the application of heat to the system, a stud member preassembled to the bight portion with means to prevent rotation of the stud relative to the body member, the stud member extending outwardly from the bight portion including a dimension transverse its longitudinal axis which is not substantially less than the space between opposing leg surfaces, the stud extending generally coplanar to the rib protuberance so that axial tension forces on the stud will tend to subject the adhesive bond to primarily shear forces.

2. A preassembled fastening device for attachment of articles to a support structure comprising a body member having a bight portion, a pair of legs joined by the bight portion and extending generally perpendicular thereto, the legs presenting a pair of opposing, protuberance embracing surfaces having a predetermined spacing therebetween, with at least one of these surfaces carrying a coating of adhesive, a fastener member having a predetermined dimension transverse its longitudinal axis, said fastener member being preassembled to the body member, said predetermined spacing generally not exceeding the predetermined transverse dimension of the fastener member, the bight portion including means to retain the fastener member with its axis transverse of the bight portion and generally parallel to the protuberance engaging surfaces, whereby the body member is slid over a protuberance and adhered thereto upon application of heat and the fastener is adapted to secure various devices to the structure.

3. A fastening device in accordance with claim 2, wherein the body member is generally U-shaped with the legs being adapted to contact opposing sides of a rib-like protuberance and adhere thereto.

4. A fastener device in accordance with claim 2, wherein the fastener member is elongate and including a shank portion and enlarged head portion.

5. A fastener device in accordance with claim 2, wherein the preassembled fastening device includes means to retain it from appreciable movement relative to the rib embracing surfaces prior to the activation of the adhesive.

6. A fastener device in accordance with claim 2, wherein the body member and fastener member include cooperating means to retain the fastener from rotation about its axis relative to the body member.

7. A fastener device in accordance with claim 2, wherein the body member and fastener member include cooperating means to retain the fastener from movement relative to the body member in a direction along the axis of the fastener.

8. A fastener device in accordance with claim 2, wherein both rib embracing surfaces carry a coating of heat activatable adhesive.

9. A fastener device in accordance with claim 2, wherein at least portions of the opposing protuberance embracing surfaces converge inwardly to provide means to at least temporarily frictionally retain the device on an associated protuberance prior to curing the adhesive.

10. A fastener device in accordance with claim 2, which is adapted for attachment of articles to a ribbed structure wherein the body member is generally U-shaped with the inner surfaces of the legs embracing the opposing sides of the rib and adapted to be secured thereto by heat activatable adhesive, the fastener member being elongate and including a shank having an enlarged head at one end, the diameter of the shank defining said predetermined transverse dimension, the shank extending outwardly from the bight and in a direction generally opposite the direction of the legs.

11. A fastening device in accordance with claim 10 wherein the retaining means maintains the fastener axis generally parallel to the planes of the rib embracing surfaces and generally perpendicular to the bight portion.

12. A fastening device in accordance with claim 10 wherein the bight portion includes an aperture and the shank of the fastener extends therethrough in direction opposite to the direction of extent of the legs whereby the head is retained beneath the bight portion.

13. A fastening device in accordance with claim 10 wherein the enlarged head is noncircular and is associated with a complementary noncircular cavity beneath the bight portion to retain the fastener against rotation relative to the body member.

14. A fastening device in accordance with claim 10 wherein the head of the fastener is polygonal and is nonrotatively retained beneath the bight portion and within recesses in the legs adjacent the juncture of the bight portion with the legs.

15. A fastener device in accordance with claim 10 wherein the head is wider in at least one direction that the distance between opposing rib embracing surfaces.

16. A fastener device in accordance with claim 10 wherein the fastener is retained in a preassembled relationship with the body through the engagement of the undersurface of the enlarged head with the undersurface of the bight portion and the engagement of the upper surface of the enlarged head with segments of the legs.

17. A fastener device in accordance with claim 10 wherein the undersurface of the enlarged head include notched portions interengaging with segments of the body member to retain the fastener from movement outwardly of the bight portion as well as from rotation about the fastener axis relative to the body member.

18. A fastening device for attachment to a substantially thin protuberance on a support structure including a body portion with a protuberance receiving recess including opposing walls spaced a predetermined distance from each other, a wall surface in said recess carrying a layer of adhesive adapted to secure the device to a protuberance, a fastener member preassembled to the body having an axis along which tension and com pressive forces may be applied, said axis being generally parallel to the adhesive carrying surface so that any such tension and compressive forces applied to the fastening device through the fastener member will load the adhesive bond in shear, the fastener member having a dimension generally perpendicular to the axis along which tension and compressive forces are applied, the predetermined distance between opposing walls of the recess of the body being not substantially greater than the fastener dimension perpendicular to the fastener axis.

19. A fastening device in accordance with claim 18, wherein the fastener member is an extrusion in a portion of the body portion extending in a plane generally perpendicular to the adhesive carrying surfaces.

20. A fastening device in accordance with claim 18, wherein the body includes a bight portion interconnecting leg portions, the bight and leg portions defining said recess, the inner surfaces of the leg portions carrying heat activatable adhesive.

21. A fastening device in accordance with claim 20, wherein the recess includes a laterally enlarged portion directly beneath the bight and includes shoulder means upon which a head portion of the fastener member abuts to retain the fastener member in preassembled arrangement with the body portion.

22. A fastening device in accordance with claim 20, wherein an enlarged head of the fastener member is positioned beneath the bight and abuts top edge portions of the leg portions.

23. A fastening device in accordance with claim 20, wherein the fastener includes an enlarged head having one lateral dimension essentially equal to the distance between the adhesive carrying surfaces, and another dimension substantially greater than the distance between the adhesive carrying surfaces.

24. A fastening device in accordance with claim 20, wherein the leg portions include barbs to temporarily secure the device on the protuberance prior to the activation of the adhesive.

25. A fastening device in accordance with claim 20, wherein the fastener includes an elongated shank and an enlarged head, the bight portion including an aperture to receive the shank and retain the head therebeneath, the head secured to the body by welding.

26. A fastening device in accordance with claim 20, wherein the body includes a plurality of legs adapted to surround a protuberance of definite lateral dimensions, the recess being complementary to the lateral dimensions of the protuberance.

27. A fastening device in accordance with claim 20, wherein the body includes two pair of leg portions extending in intersecting planes to form a recess capable of receiving two intersecting ribs.

28. A fastening device in accordance with claim 20, wherein the fastener includes an enlarged head extending axially of an elongated shank, the head including a plurality of radially extending ribs, the walls of the legs including slits adapted to lockingly retain the ribs as the fastener is forced through the bight portion in a plane generally parallel to the adhesive carrying surfaces.

29. A fastening device in accordance with claim 20, wherein the fastener member includes an axially extending projection which is upset beneath the bight portion to retain the fastener in preassembled condition therewith.

* * * * *